US009730034B2

(12) United States Patent
Kim et al.

(10) Patent No.: US 9,730,034 B2
(45) Date of Patent: Aug. 8, 2017

(54) METHOD FOR TRANSMITTING MESSAGE BASED ON COMMUNICATION NETWORK

(71) Applicant: Samsung Electronics Co., Ltd., Suwon-si, Gyeonggi-do (KR)

(72) Inventors: Kyu Hyun Kim, Suwon-si (KR); Da Rae Ahn, Seoul (KR); Jun Ho You, Goyang-si (KR); Jin Yul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 14/829,050

(22) Filed: Aug. 18, 2015

(65) Prior Publication Data

US 2016/0057589 A1 Feb. 25, 2016

(30) Foreign Application Priority Data

Aug. 19, 2014 (KR) ........................ 10-2014-0107789

(51) Int. Cl.
*H04W 4/14* (2009.01)
*H04W 80/04* (2009.01)

(52) U.S. Cl.
CPC ............. *H04W 4/14* (2013.01); *H04W 80/04* (2013.01)

(58) Field of Classification Search
CPC ............................... H04W 4/14; H04W 80/04
See application file for complete search history.

(56) References Cited

U.S. PATENT DOCUMENTS

| 8,989,151 | B2 | 3/2015 | Ewert et al. | |
|---|---|---|---|---|
| 2005/0124299 | A1* | 6/2005 | Scribano | H04W 28/18 455/68 |
| 2012/0052885 | A1* | 3/2012 | Zhang | H04W 76/026 455/458 |
| 2012/0134351 | A1 | 5/2012 | Ewert et al. | |

* cited by examiner

*Primary Examiner* — Kashif Siddiqui
(74) *Attorney, Agent, or Firm* — Jefferson IP Law, LLP

(57) ABSTRACT

A message transmitting method of an electronic device supporting to transmit and receive a message of a first format is provided. The message transmitting method includes obtaining information on at least one bearer type allowing the electronic device to transmit or receive a message, determining whether the electronic device transmits or receives a message of a second format different from the first format based on at least one of the at least one bearer type, and transmitting the message using the second format or the first format, in which a specific value is set to be compatible with the second format, based on the determination result.

16 Claims, 9 Drawing Sheets

```
private boolean isFormatGap() {
    ............
    if (isImsDevice) {
        if (ImsFormat.euquals(CsFormat)) { //SV-LTE
            return false;
        } else {
            return true;
        }
    }
    ..........
}
```
~501

```
synchronized static int getNextMessageId() {
    ...............
    if (isFormatGap()) {
    msgId = msgId % 0x00FF;
    }
    ..............
        return msgId;
}
```
~502

```
private boolean isCdmaMo() {
    ..............
    // IMS is registered with SMS support
    return isCdmaFormat(mImsSmsFormat) && !isFormatGap();
}
```
~503

FIG.5

METHOD FOR TRANSMITTING MESSAGE BASED ON COMMUNICATION NETWORK

CROSS-REFERENCE TO RELATED APPLICATION(S)

This application claims the benefit under 35 U.S.C. §119 (a) of a Korean patent application filed on Aug. 19, 2014 in the Korean Intellectual Property Office and assigned Serial number 10-2014-0107789, the entire disclosure of which is hereby incorporated by reference.

TECHNICAL FIELD

The present disclosure relates to an error or a compatibility problem caused when, in an electronic device, a communication network for transmitting and receiving a message is changed to a communication network complying with a communication standard different therefrom.

BACKGROUND

Before the introduction of long term evolution (LTE) or Internet protocol (IP) multimedia subsystem or IP multimedia core network subsystem (IMS) technology, a format of a message transmitted from an electronic device such as a smart phone may comply, in general, with a standard defined at a circuit switching (CS) network. For example, in the case where the CS network is a code division multiple access (CDMA) network, the message format may be determined according to the 3rd Generation Partnership Project 2 (3GPP2) communication standard; in the case where the CS network is a global system for mobile communications (GSM network), the message format may be determined according to the 3GPP communication standard.

As a global model of the electronic device such as the smart phone is released and an LTE network is constructed, a short service message (SMS) over IMS service using the IMS or a (SG-SMS) (SMS with LTE) using the LTE network as well as an SMS using a CS network of the related art may be possible.

As described above, a method for transmitting a message through an LTE network may include "SMS over IMS" for transmitting the message in SG-SMS through a control channel of the LTE network or for transmitting the message in session initiation protocol (SIP) through the IMS. A compatibility problem may occur if an electronic device supporting the IMS transmits and receives a message in compliance with the 3GPP2 in the CS network and transmits and receives a message in compliance with the 3GPP in the packet switching (PS) network.

Furthermore, an electronic device of a CDMA provider such as Verizon, KDDI, Sprint, or the like may support the SMS over IMS and may provide a GSM roaming service at a roaming situation (e.g., in the case where a terminal of the provider is in an European area). In the roaming situation, the electronic device may only connect to an LTE network (i.e., a PS network) at a circuit switched fall-back (CSFB) network environment. However, it may be impossible to know information of the CS network using information of the PS network, thereby making it impossible for the electronic device to determine an SMS format using the CS network. In this case, the electronic device (i.e., a CDMA provider terminal) may transmits a message according to the CDMA format (3GPP2), and transmitting of a message may fail in a situation where roaming is made in the GSM network CS.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device capable of assuring compatibility and preventing an error in a situation where it is possible to transmit and receive a message according to different specifications.

In accordance with an aspect of the present disclosure, a message transmitting method of an electronic device supporting to transmit and receive a message of a first format is provided. The message transmitting method includes obtaining information on at least one bearer type allowing the electronic device to transmit or receive a message, determining whether the electronic device transmits or receives a message of a second format different from the first format based on at least one of the at least one bearer type, and transmitting the message using the second format or the first format, in which a specific value is set to be compatible with the second format, based on the determination result.

In accordance with an aspect of the present disclosure, an electronic device supporting to send transmit and receive a message of at least a first format is provided. The electronic device comprising a communication module configured to send transmit and receive a message, and a message management module configured to decide determine a format of a message to be sent transmitted by the communication module. The message management module is further configured to determine whether to send transmit or receive a message of a second format different from the first format using at least one bearer type allowing the communication module to send transmit or receive a message and to decide determine the message format based on the determination result.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates an algorithm used to process message compatibility and determine a message format according to various embodiments of the present disclosure;

Throughout the drawings, it should be noted that like reference numbers are used to depict the same or similar elements, features, and structures.

DETAILED DESCRIPTION

Figure 1:
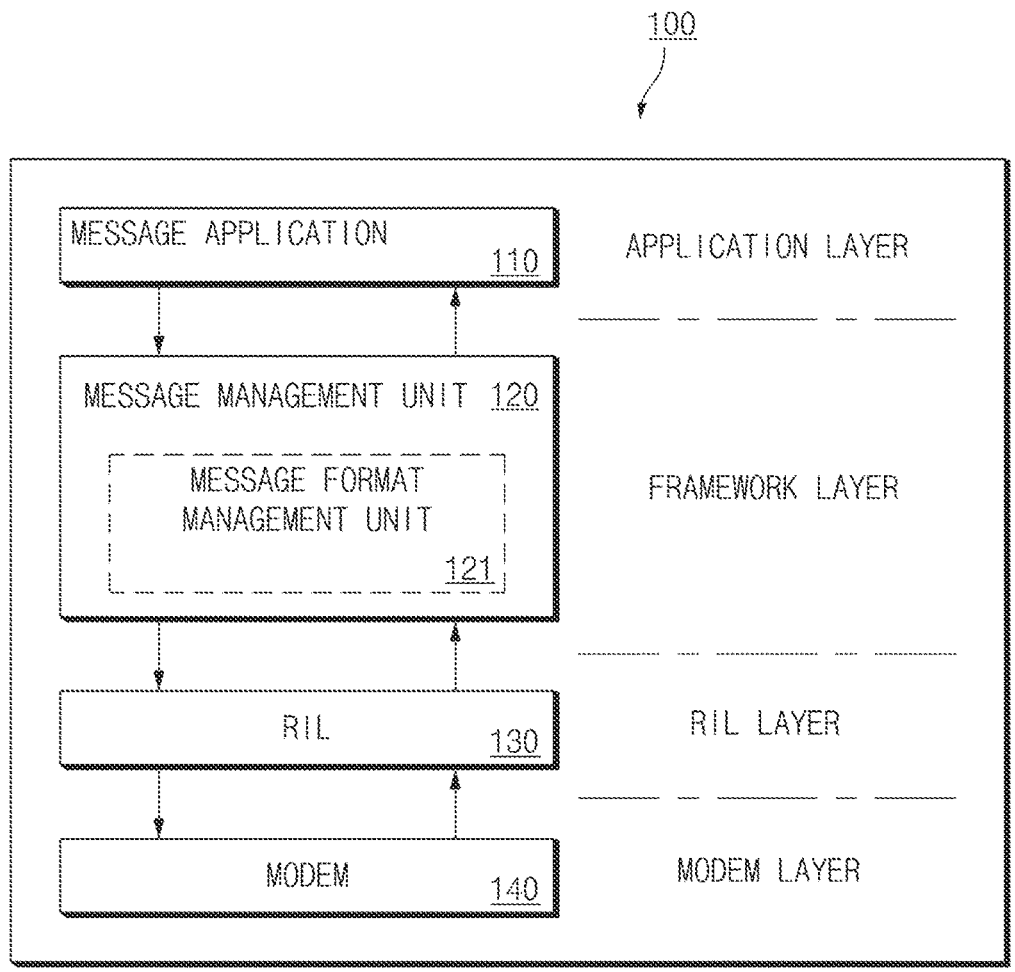
FIG. 1 illustrates an electronic device for transmitting and receiving a message according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, integers, operations, elements, components, or combinations thereof but does not preclude the presence or addition of one or more other features, integers, operations, elements, components, or combinations thereof. The meaning of the term "or" or "at least one of A and/or B" used herein includes any combination of words listed together with the term. For example, the expression "A or B" or "at least one of A and/or B" may indicate A, B, or both A and B.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing from the scope of the present disclosure, a first element may be referred to as a second element, and similarly, a second element may be referred to as a first element.

In the description below, when one part (or element, device, etc.) is referred to as being "connected" to another part (or element, device, etc.), it should be understood that the former may be "directly connected" to the latter, or "electrically connected" to the latter via an intervening part (or element, device, etc.). It will be further understood that when one component is referred to as being "directly connected" or "directly linked" to another component, it means that no intervening component is present.

Terms used in this specification are used to describe embodiments of the present disclosure and are not intended to limit the scope of the present disclosure.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure.

Electronic devices according to various embodiments of the present disclosure may include an electronic device having a communication function. For example, the electronic devices may include at least one of smartphones, tablet personal computers (PCs), mobile phones, video telephones, electronic book readers, desktop PCs, laptop PCs, netbook computers, personal digital assistants (PDAs), portable multimedia players (PMPs), moving picture experts group phase 1 or phase 2 (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to various embodiments of the present disclosure, the electronic devices may be smart home appliances including a communication function. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, electronic picture frames, and the like.

According to various embodiments of the present disclosure, the electronic devices may include at least one of medical devices (e.g., a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), and points of sales (POSs).

According to various embodiments of the present disclosure, the electronic devices may include at least one of parts of furniture or buildings/structures having communication functions, electronic boards, electronic signature receiving devices, projectors, and measuring instruments (e.g., water meters, electricity meters, gas meters, and wave meters) including metal cases.

The electronic devices according to various embodiments of the present disclosure may be one or more combinations of the above-mentioned devices. Furthermore, the electronic devices according to various embodiments of the present disclosure may be flexible devices. It would be obvious to those skilled in the art that the electronic devices according to various embodiments of the present disclosure are not limited to the above-mentioned devices.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 illustrates an electronic device for transmitting and receiving a message according to various embodiments of the present disclosure.

Referring to FIG. 1, an electronic device 100 may include a message application 110, a message management unit (telephony) 120, a radio interface layer (RIL) 130, and a modem 140. A configuration illustrated in FIG. 1 may be easily understood that the configuration may be changed or modified appropriately. For example, a message format management unit 121 may be placed outside the message management unit 120. Furthermore, the message format management unit 121 may be understood as a long term evolution (LTE) short message service (SMS) format management unit that manages a message (SMS) format at an LTE network environment.

According to various embodiments of the present disclosure, a user of the electronic device 100 may execute the message application 110 to input a message. This may be performed on an application layer. The input message may be provided to the message management unit 120, and the message management unit 120 may form a user input transferred from the message management unit 120 into a SMS form. The message management unit 120 may form a protocol data unit (PDU) with a format fit to a network to which the electronic device 100 is currently connected. For example, in the case where the electronic device 100 is currently connected to a circuit switching (CS) network (e.g., a global system for mobile communications (GSM) network) complying with the $3^{rd}$ Generation Partnership Project (3GPP) standard, the message management unit 120 may determine a message format of the 3GPP standard to form the PDU. In this case, a message identifier (ID) may have a value of 1 Byte or may have a value between 0 and 255. If the electronic device 100 is currently connected to the CS network (e.g., a code division multiple access (CDMA) network) complying with the 3GPP2 standard, the message ID may have a value of two bytes or may have a value between 0 and 65535.

According to various embodiments of the present disclosure, the message format management unit 121 may determine a compatibility or transmission error caused in the case where the electronic device 100 determines a message format based on a currently connected network and may change a currently set message format or may change a portion (e.g., PDU) of a value of a message so as to have compatibility with respect to other standards, with a current format retained. For example, the message format management unit 121 may determine a message format by comparing an SMS format of the SMS over Internet protocol (IP) multimedia subsystem (IMS) and a format of the CS network. For example, in the case where the SMS format of the SMS over IMS and the SMS format of the CS network all comply with the 3GPP2 standard or the 3GPP standard, the message format management unit 121 may determine a message format fit to a corresponding standard. In the case where the SMS format of the SMS over IMS complies with the 3GPP2 standard and the CS network (e.g., a CDMA network) complies with the 3GPP standard or in the case where the CS network (e.g., a CDMA network) complies with the 3GPP2 standard and the SMS format of the SMS over IMS complies with the 3GPP standard, the message format management unit 121 may determine a message format (e.g., a message ID being set to 1 byte) so as to become compatible with each other.

Additionally, the message format management unit 121 may manage whether the electronic device 100 is a device supporting the IMS and whether or not of IMS registration. Furthermore, the message format management unit 121 may determine a message format by piecing a radio access technology (RAT) information, subscriber identification module (SIM) type information, mobile country code (MCC)/mobile network code (MNC) information, roaming information, and the like of the CS network together.

According to various embodiments of the present disclosure, a procedure performed by the message format management unit 121 may be performed on a framework layer. Various embodiments of the present disclosure in which the message format management unit 121 determined a message format will be more fully described with reference to FIGS. 2 to 6.

The message management unit 120 may provide a message having an appropriate format to the modem 140 through the RIL 130. The modem 140 may be understood as a communication module and may support various communication manners such as Wi-Fi, Bluetooth (BT), 3G, LTE, and the like.

Figure 2:
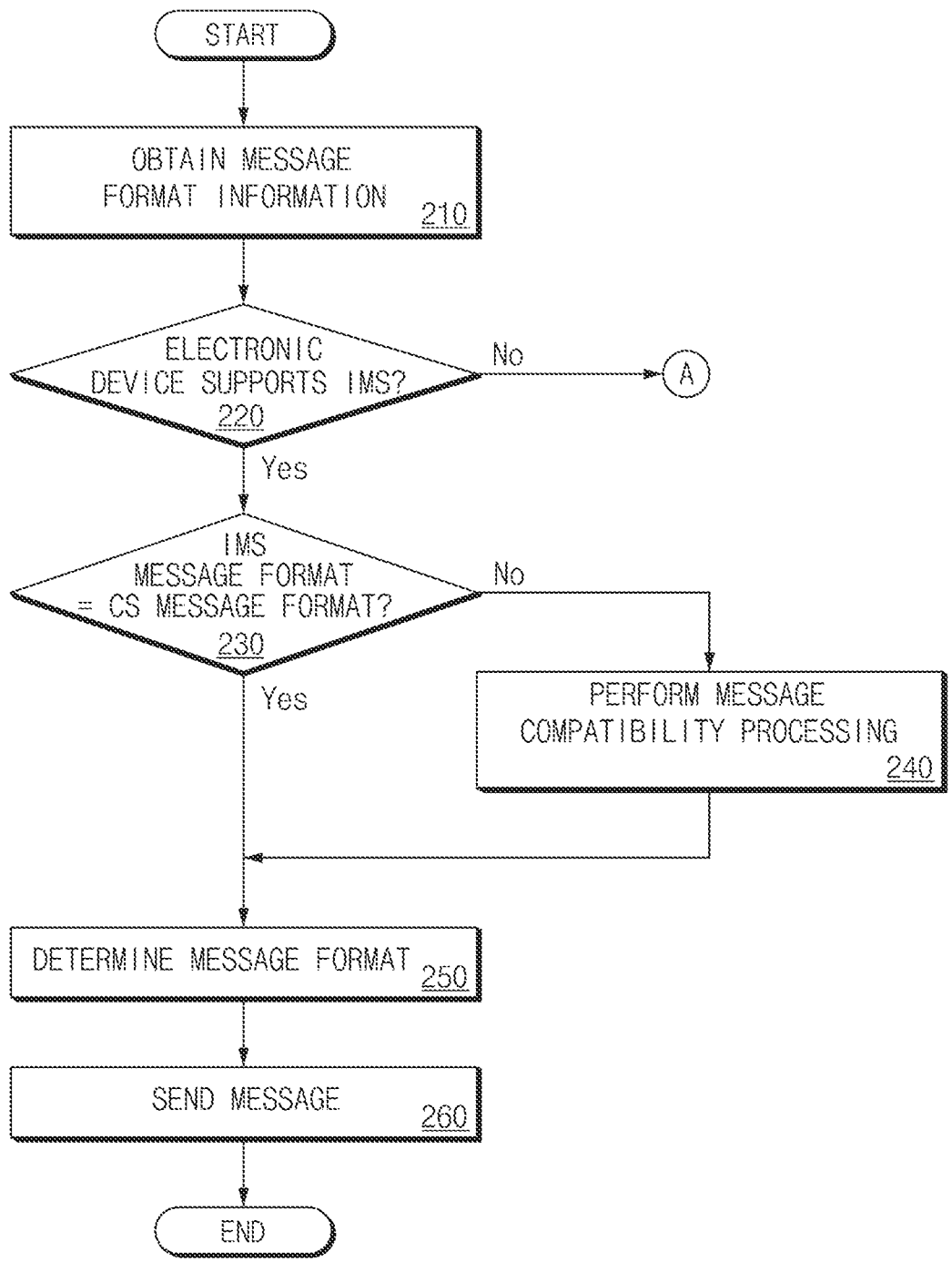
FIG. 2 illustrates a message compatibility processing method according to various embodiments of the present disclosure.

FIG. 2 illustrates a message compatibility processing method according to various embodiments of the present disclosure.

Referring to FIG. 2, in operation 210, an electronic device 100 may obtain message format information. The message format information may be information associated with a format of a message that the electronic device 100 supports to transmit and receive. For example, in the case where the electronic device 100 supports to transmit and receive an LTE-based message (SG-SMS), an IMS-based message (SMS over IMS), and a CS network-based message (SMS), it may be possible to obtain message format information on each bearer type.

In operation 220, the electronic device 100 may determine whether the electronic device 100 supports an IMS. For example, a message management unit 120 of the electronic device 100 may query whether to support the IMS to a message format management unit 121 and may determine whether the electronic device supports the IMS, based on a response to the query. Determination of whether to support the IMS may be made due to the following reasons.

In general, an electronic device such as a smart phone may be connected to both an LTE network (a packet switching (PS) network) and a $2^{nd}$ generation (2G)/3G network (a CS network). Alternatively, the electronic device may be connected to one of the LTE network and the 2G/3G network and may switch into a network (e.g., a circuit switched fall-back (CSFB) manner) different from the networks in case of necessity. For example, in the cases of the related art where an electronic device provided by a CDMA provider uses the LTE and where the electronic device uses the 3G, the electronic device may transmit and receive a message based on the 3GPP2. If a second terminal normally receives a message transmitted from a first terminal, a base station (a server) may transmit a delivery report providing notification that a message normally arrives at the first terminal. The delivery report may include a message ID indicting a message that the first terminal transmits. The first terminal may compare the message ID included in the delivery report and a message ID included in a previously transmitted message; in the case where the message IDs are equal to each other, a message may be determined as being normally transmitted.

However, even though an electronic device is provided by a provider using a communication network of a CDMA manner (e.g., a 3GPP2 manner), the detection device may use a 3GPP manner in the IMS. In this case, a message ID of a message transmitted according to the 3GPP2 manner may have a 2-byte value between 0 and 65535. For example, if attached to the LTE or 3G network, the first terminal may perform an IMS registration operation through an IMS public data network (PDN). After the IMS registration is completed, it may be possible to provide a call or SMS function using the IMS. If a message is transmitted in the CDMA manner before the IMS registration of the first terminal is completed, the message may have a message ID of two bytes.

In the case where the IMS registration of the first terminal is completed after transmitting the message and the IMS complies with the 3GPP manner, a message which the first terminal receives or is transmitted from the first terminal may comply with the 3GPP standard. In this case, a delivery report on a message (a 3GPP2 standard) which the first terminal transmits before the IMS registration is completed may be received based on the 3GPP standard. In this case, according to the 3GPP standard, a message ID may have a 1-byte value. For this reason, a message ID (two bytes) of a message which the first terminal transmits may not be normally recognized. Accordingly, even though a message is transmitted, the first terminal may not normally check a report providing notification that transmitting is accomplished.

With the above description, whether the electronic device 100 supports the IMS may be determined in operation 220. However, the scope and spirit of the present disclosure may not be limited thereto. For example, supportable services of types, of which the message formats may be changed, from among bearer types for use in the electronic device 100 may be determined instead of or together with whether to support the IMS.

If the electronic device 100 is determined in operation 220 as not supporting the IMS, in operation A, the electronic device 100 may determine a message format based on CS network information and may transmit a message. The case that the electronic device 100 does not comprehend a CS network type will be more fully described with reference to FIG. 3.

If the electronic device 100 is determined in operation 220 as supporting the IMS, in operation 230, the electronic device 100 may determine whether an IMS message format is the same as a message format of the CS network. If the IMS message format is the same as the message format of the CS network, in operation 250, the electronic device 100 may determine a message format. For example, in the case where both the IMS message format and the message format of the CS network comply with the 3GPP standard, the electronic device 100 may determine the message format so as to comply with the 3GPP standard. For example, in the case where the IMS message format complies with the 3GPP2 and the message format of the CS network also complies with the 3GPP2 standard, the electronic device 100 may determine the message format so as to comply with the 3GPP2 standard.

In the case where a determination result of operation 230 indicates that the IMS message format is not the same as the message format of the CS network, in operation 240, the electronic device 100 may perform message compatibility processing to allow different message formats to be compatible with each other. For example, in the case where the IMS message format complies with the 3GPP and the message format of the CS network complies with the 3GPP2 standard, the electronic device 100 may assign a 2-byte message ID value (0 to 65536) of a message format of the 3GPP2 standard, which is transmitted through the CS network before IMS registration, using a 1-byte value, that is, a value between 0 to 255. For example, according to the 3GPP2 standard, a value of a message ID may gradually increase from "0" and may be again counted from "0" after reaching "65535".

According to an embodiment of the present disclosure, however, in the 3GPP2, a message ID may be set not to exceed a range from 0 to 255, thereby making it possible to be exactly matched with a previously transmitted message even when receiving a delivery report complying with the 3GPP2 standard. Furthermore, for example, in the case where the IMS message format complies with the 3GPP2 standard and the message format of the CS network complies with the 3GPP standard, separate compatibility processing may not be performed when a message is transmitted in the CS network before IMS registration (a message has a 1-byte message ID and is identifiable even at the IMS complying with the 3GPP2). In this case, however, compatibility processing may be required to transmit a message using the IMS. The reason may be that a delivery report and the like on a message transmitted at an IMS registration state is not normally identified if the electronic device 100 transmits a message complying with the 3GPP2 standard in the IMS and IMS registration is released.

In operation 250, the electronic device 100 may determine a message transfer format. In the case where the determination result of operation 230 indicates that an IMS-based message format and a CS network-based message format comply with the same standard, a message format corresponding to the same standard may be determined. In the case where the determination result of operation 230 indicates that both formats are different from each other, a message format may be determined by performing message compatibility processing in operation 240 and applying the compatibility processing in operation 250.

In operation 260, the electronic device 100 may transmit a message based on a message format determined in operation 250. This operation may be performed by a modem 140 or a communication module.

Figure 3:
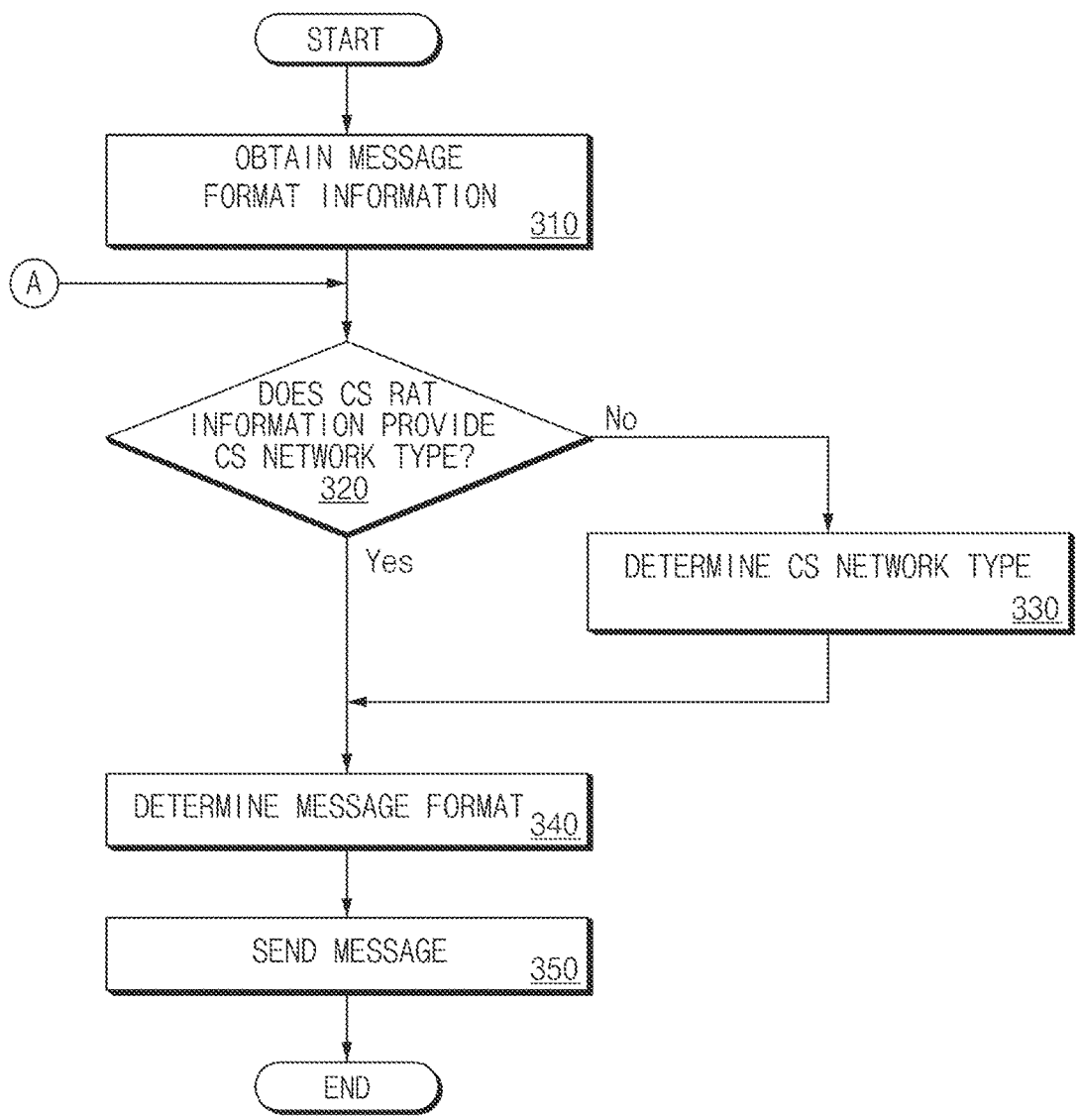
FIG. 3 illustrates a message format determining method according to various embodiments of the present disclosure.

FIG. 3 illustrates a message format determining method according to various embodiments of the present disclosure. A process illustrated in FIG. 3 may be performed independently or may be performed in conjunction with a process described with reference to FIG. 2. Below, a description duplicated with, corresponding to or similar to the above description will be omitted.

Referring to FIG. 3, in operation 310, message format information may be obtained. For example, in the case where an electronic device 100 is currently connected to an LTE network and supports an IMS, there may be obtained format information of a message exchanged through the IMS. Furthermore, in the case where the electronic device 100 is connected to a 3G network of a CDMA manner, there may be obtained format information (e.g., a message format complying with a 3GPP2 standard) exchanged through a corresponding CS network.

According to various embodiments of the present disclosure, the electronic device 100 may be located abroad (or at a region necessitating roaming). For example, as a CDMA provider terminal user equipment (UE), the electronic device 100 may be at a region in Europe in which a GSM manner is used. In this case, if a network to which the electronic device 100 is connected is a network in which it is impossible to obtain information of a CS network such as CSFB, an error may occur when the electronic device 100 transmits a message. For example, in the above-described example, if the electronic device 100 transmits a message under connection with an LTE network (and in the case where the electronic device 100 does not support the IMS), the electronic device 100 may transmit a message in a SG-SMS manner using the LTE. In this case, however, a response such as LTE or No Service may be simply obtained in requesting CS radio access technology (CS RAT) information from an RIL 130 to obtain CS network information. Accordingly, the electronic device 100 (a CDMA provider terminal) may transmit a message in a message format (a first format: 3GPP2 standard manner) complying with the CDMA manner, but transmitting of a message may fail because a network of a GSM manner may be used in a region where the electronic device 100 currently exists.

Returning to FIG. 3, in operation 320, the electronic device 100 may determine whether the CS RAT information provides a CS network type (e.g., whether or not of a CDMA manner or a GSM manner). If the CS RAT information provides information on the CS network type, operation 330 may not be performed, but operation 340 may be performed. However, if the CS RAT information does not provide information on the CS network type, the electronic device 100 may perform operation 330 in which the CS network type is determined based on other additional information.

According to various embodiments of the present disclosure, the electronic device 100 may determine the CS network type using information on whether the electronic device 100 remains at a roaming state. For example, in the case where the electronic device 100 remains at a roaming state, it may be possible to obtain information on the CS network type which a communication network of the roaming region uses. The information may be previously stored at a storage space (e.g., a memory) of the electronic device 100 or may be included in information (e.g., a non-access stratum (NAS) message) from a base station. For example, if receiving the NAS message from the base station (or a server), the modem 140 may provide the received message to the RIL 130, and the RIL 130 may decode the received message to provide a message management unit 120 or a message format management unit 121 with information on a CS network type (e.g., CDMA, GSM, and the like) of a current roaming region.

According to various embodiments of the present disclosure, the electronic device 100 may determine the CS network type using SIM mounted on an electronic device or information on a provider associated with the SIM. For example, in the case where a user of the electronic device 100 may change the SIM to a provider SIM of the roaming region (e.g., change the SIM from Verizon SIM to Orange Telecom SIM or Deutsche Telekom SIM), bearer-type information may be obtained based on CS network type information (e.g., a network of a GSM manner) set by a corresponding provider for use.

According to various embodiments of the present disclosure, the electronic device 100 may determine the CS network type using MCC/MNC information. The MCC may be generally used together with the MNC and may be comprehended as MCC/MNC tuple. For example, in the case where the MCC/MNC is 262/02, it may be possible to obtain information indicating that a Vodafone provider provides a network service using GSM 900, GSM 1800, universal mobile telecommunications system (UMTS) 2100, and LTE 2600. According to various embodiments of the present disclosure, the electronic device 100 may determine the CS network type using MCC information, not MNC information. For example, in the case where the MCC value is 450, the electronic device 100 may know that the CS network is based on the CDMA and a network is a network provided at the Korea, without referring to the MNC value.

According to various embodiments of the present disclosure, the electronic device 100 may determine a CS network type using LTE SMS status information as additional information. For example, information (an NAS message and the like) which the electronic device 100 receives from a base station may include the LTE SMS status information. The status information may include information indicating a CS network that the base station uses.

The above-described CS network type information may be used independently to determine the CS network type, or a combination of two or more pieces of CS network type information may be used to determine the CS network type. Information on the CS network type may be obtained in such a manner. This may be understood as an operation of obtaining bearer-type information indicating a standard which a CS bearer type complies with.

In operation 340, the electronic device 100 may determine a format of a transmission message. For example, if the CS RAT information is determined in operation 320 as providing an appropriate CS network type (e.g., a GSM or CDMA manner), there may be determined a format (e.g., a message format complying with a 3GPP or 3GPP2 standard) of a message based on a corresponding type. For example, if the CS RAT information is determined in operation 320 as not providing an appropriate CS network type (e.g., an LTE, No Service, or the like), a message format according to a CS network type determined in operation 330 may be determined.

According to various embodiments of the present disclosure, operation 340 may be understood as the following manner. For example, in the case where the electronic device 100 is a terminal supporting a first format (e.g., a message format of a CDMA manner) basically, the electronic device 100 may determine the first format as a message format if a CS network type which the CS RAT information provides is determined as being a CDMA manner (operation 320). In the case where the CS network type which the CS RAT information provides is determined as being a GSM manner, the electronic device 100 may determine a second format (e.g., a message format of a GSM manner) different from the first format as a message format. In the case where a CS network is determined using additional information in operation 330 because a CS network type that the CS RAT information provides is inappropriate, a message format may be determined according to a determination result. For example, in the case where the determination result indicates that the electronic device 100 is capable of transmitting and receiving a message of a second format, the second format may be determined as a message format.

In operation 350, the electronic device 100 may transmit a message using a message format determined in operation 340.

Figure 4:
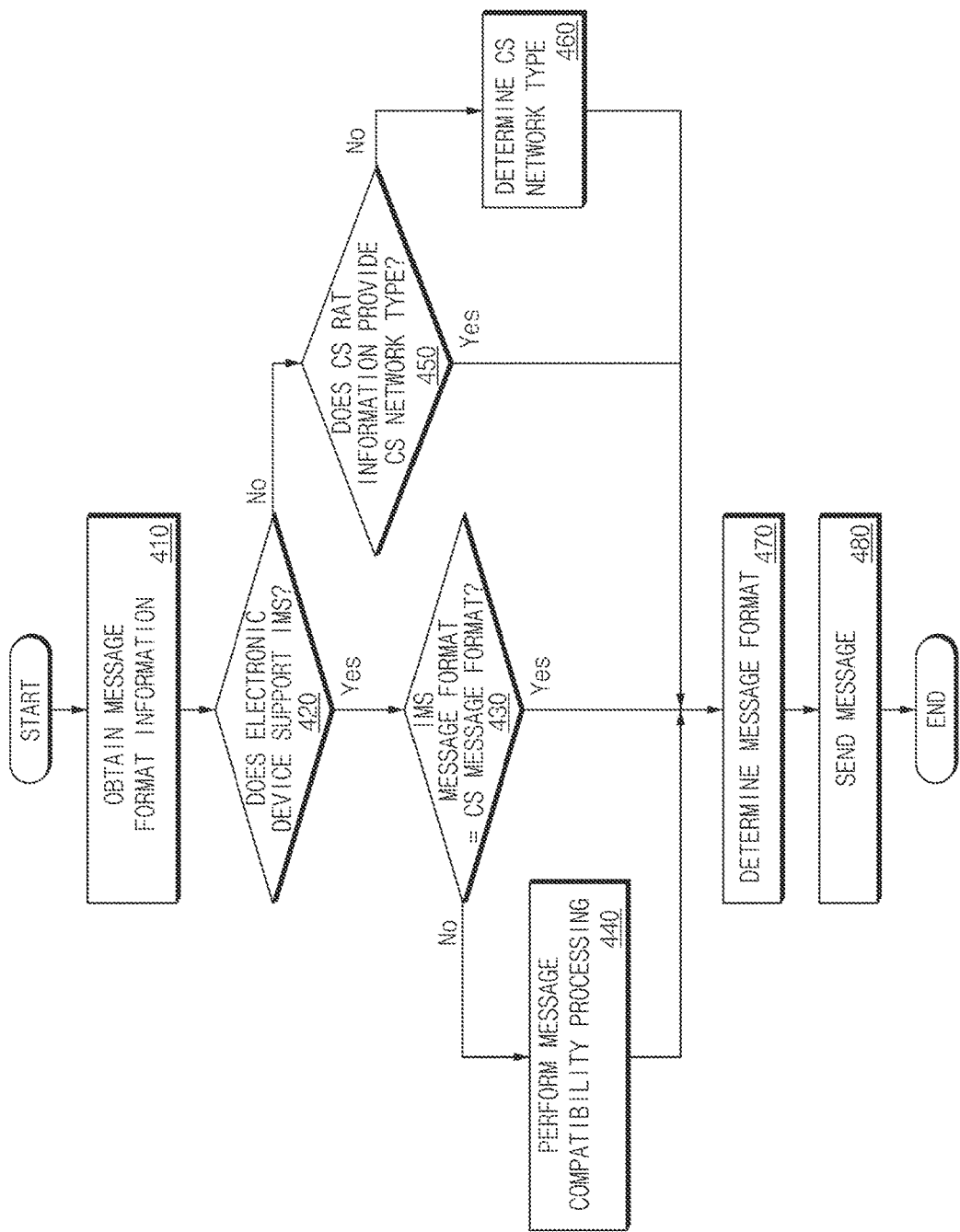
FIG. 4 illustrates a message compatibility processing and message format determining method according to various embodiments of the present disclosure.

FIG. 4 illustrates a message compatibility processing and message format determining method according to various embodiments of the present disclosure. FIG. 4 may be understood as processes described with reference to FIGS. 2 and 3 are combined, and a description duplicated with the above description may be omitted.

Referring to FIG. 4, in operation 410, an electronic device 100 may obtain a message format. In operation 420, whether the electronic device 100 is a terminal supporting an IMS may be determined. In the case where the electronic device 100 is a terminal supporting the IMS, in operation 430, the electronic device 100 may determine whether an IMS-based message format is the same as a CS network-based message format. In the case where the message formats correspond to each other, in operation 470, the electronic device 100 may determine a corresponding format as a message format. Otherwise, in operation 440, the electronic device 100 may perform an operation for ensuring compatibility between the IMS and the CS network. Afterward, in operation 470, the electronic device 100 may determine a format to which an operation for ensuring compatibility is applied, as a message format.

Returning to operation 420, in the case where the electronic device 100 is a terminal not supporting the IMS, it may be impossible to transmit a message using the IMS and a transmitting error may occur in transmitting a message without checking CS network information. For this reason, the method may proceed to operation 450 to determine whether the CS RAT information provides a CS network type. If the CS RAT information provides the CS network type, the method may proceed to operation 470 to determine a message format based on the CS network type. If the CS RAT information does not provide the CS network type, the electronic device 100 may perform an operation for determining the CS network type in operation 460. This may correspond to the above description given with reference to FIG. 3, and a description thereof may be thus omitted.

According to various embodiments of the present disclosure, the case that it is impossible to know a message format of a CS network in operation 430 may occur. For example, in the case where an electronic device is connected only to an LTE and supports an IMS, the case that it is impossible to know a message format of the CS network may occur because the electronic device is not connected to the CS network. In such a case, the electronic device 100 may perform operation 320 and/or operation 330 (or operation 450 and/or operation 460) and may again perform operation 430.

FIG. 5 illustrates an algorithm used to process message compatibility and to determine a message format according to various embodiments of the present disclosure.

Referring to FIG. 5, a code 501 of FIG. 5 may be a code for returning a value corresponding to the true or false by determining whether or not of an IMS device and determining whether an IMS-based message format is the same as a CS-based message format.

Furthermore, a code 502 may be a code for generating a 1-byte message ID for compatibility in generating the message ID.

A code 503 may be a code for determining whether an IMS format is associated with CDMA (e.g., refer to "isCdmaFormat (mImsSmsFormat)"), determining whether a difference exist between the IMS-based format and the CS network-based format (e.g., whether the IMS and the CS all are 3GPP2 or 3GPP or whether one of the IMS and the CS is 3GPP2 and the other thereof is 3GPP (refer to "isFormatGap( )")), and returning a value of a "isCdmaMo( )" function when the IMS format is associated with the CDMA and no difference exist between the IMS-based format and the CS network-based format.

Figure 6:
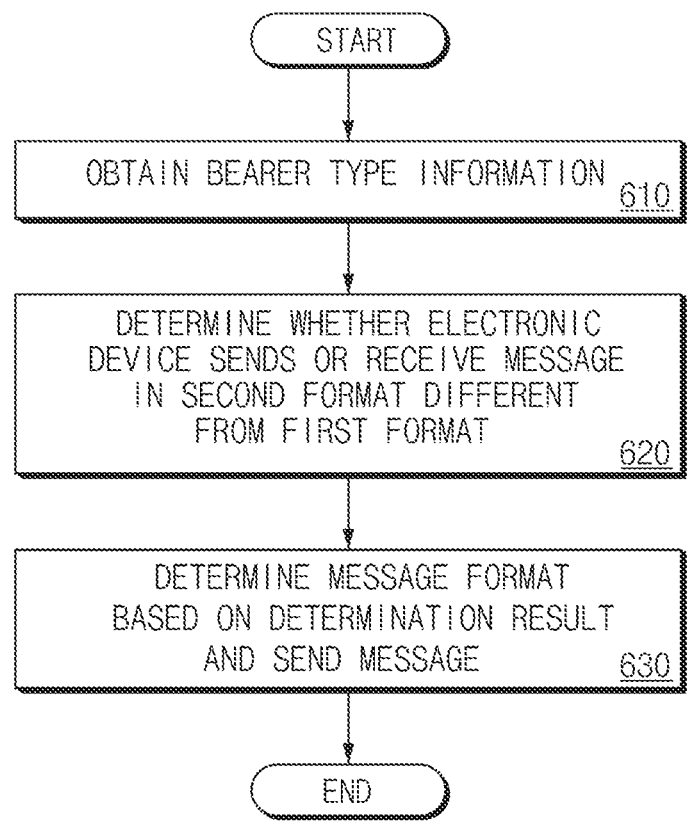
FIG. 6 illustrates a general message format determining method according to various embodiments of the present disclosure.

FIG. 6 illustrates a general message format determining method according to various embodiments of the present disclosure.

Referring to FIG. 6, in operation 610, there may be obtained at least one bearer-type information allowing an electronic device, which transmits and receives a message of a first format, to transmit or receive a message. For example, an electronic device 100 may check a bearer type allowing an electronic device, which is set to transmit and receive a message of a 3GPP2-based format in operation 610, to transmit or receive a message at a current network state. For example, the electronic device 100 may check bearer types such as 3GPP-based IMS, 3GPP2-based LTE, 3GPP2-based CS, and the like.

In operation 620, the electronic device 100 may determine whether to transmit or receive a message of a second format different from the first format through at least one of the bearer types. For example, the electronic device 100 may determine whether to transmit and receive a message of a 3GPP-based format by IMS. Alternatively, the electronic device 100 may support to transmit and receive a 3GPP2-based message, but may transmit and receive a message in a 3GPP-based format in a current CS network. Otherwise, the electronic device 100 may determine whether transmitting of a message fails.

In operation 630, based on the determination result, the electronic device 100 may determine the second format or the first format, which is set such that a specific value is compatible with the second format, as the message format and may transmit the message. For example, in the case where the electronic device 100 transmits and receives a message in a 3GPP2-based format by the CS network and transmits and receives a message in a 3GPP-based format by the IMS, the electronic device 100 may determine the 3GPP2 format, set to be compatible with the 3GPP, as a message format. Furthermore, for example, in the case where the electronic device 100 does not transmit a message using the IMS and transmits a message in a 3GPP-based message format using the CS network, it may determine the 3GPP-based format as the message format and may transmit a message using the determined format.

According to various embodiments of the present disclosure, a message transmitting method of an electronic device supporting to transmit and receive a message of a first format may include obtaining information on at least one bearer type allowing the electronic device to transmit or receive a message, determining whether the electronic device transmits or receives a message of a second format different from the first format based on at least one of the bearer types, and transmitting the message using the second format or the first format, in which a specific value is set to be compatible with the second format, based on the determination result.

According to various embodiments of the present disclosure, the first format and the second format may be message formats respectively defined by 3GPP2 and 3GPP. The determining may include determining whether the electronic device supports an IMS and determining whether to receive a message of the second format at an IMS registration state of the electronic device.

The transmitting of the message may include setting a value of a message ID of the first format to a value compatible with the second format. In this case, the message ID may have a value of one byte. Furthermore, according to various embodiments of the present disclosure, a value of the message ID may be used for a delivery report message received from a server.

According to various embodiments of the present disclosure, the obtaining may include obtaining information on a network to which the electronic device is connected and obtaining information on a bearer type associated with a CS network using additional information if the information of the network does not include information on a CS network type.

Furthermore, the additional information may include whether the electronic device remains at a roaming state. In the case where the electronic device remains at the roaming state, the obtaining of information on a bearer type associated with a CS network may include obtaining information on the at least one bearer type based on a roaming region.

Furthermore, the additional information may include information on a provider associated with an SIM mounted on the electronic device. In this case, the obtaining of information on a bearer type associated with a CS network may include obtaining information on the at least one bearer type based on CS network type information set such that the provider associated with the SIM uses.

Furthermore, the additional information may include MCC or MNC information. In this case, the obtaining of information on a bearer type associated with a CS network may include obtaining information on the at least one bearer type using the MCC or MNC information.

Furthermore, the additional information may include LTE SMS status information. In this case, the obtaining of information on a bearer type associated with a CS network may include obtaining information on the at least one bearer type based on a CS network type specified in the LTE SMS status information.

According to various embodiments of the present disclosure, the determining may include determining whether the first format and the second format correspond to each other, and a message may be transmitted using the second format if the determination result indicates that the first format and the second format does not correspond to each other.

According to various embodiments of the present disclosure, the obtaining of information on a bearer type associated with a CS network may be performed if information on the at least one bearer type does not include IMS information, and the message transmitting method may further include transmitting the message through an IMS if information on the at least one bearer type includes the IMS information.

Figure 7:
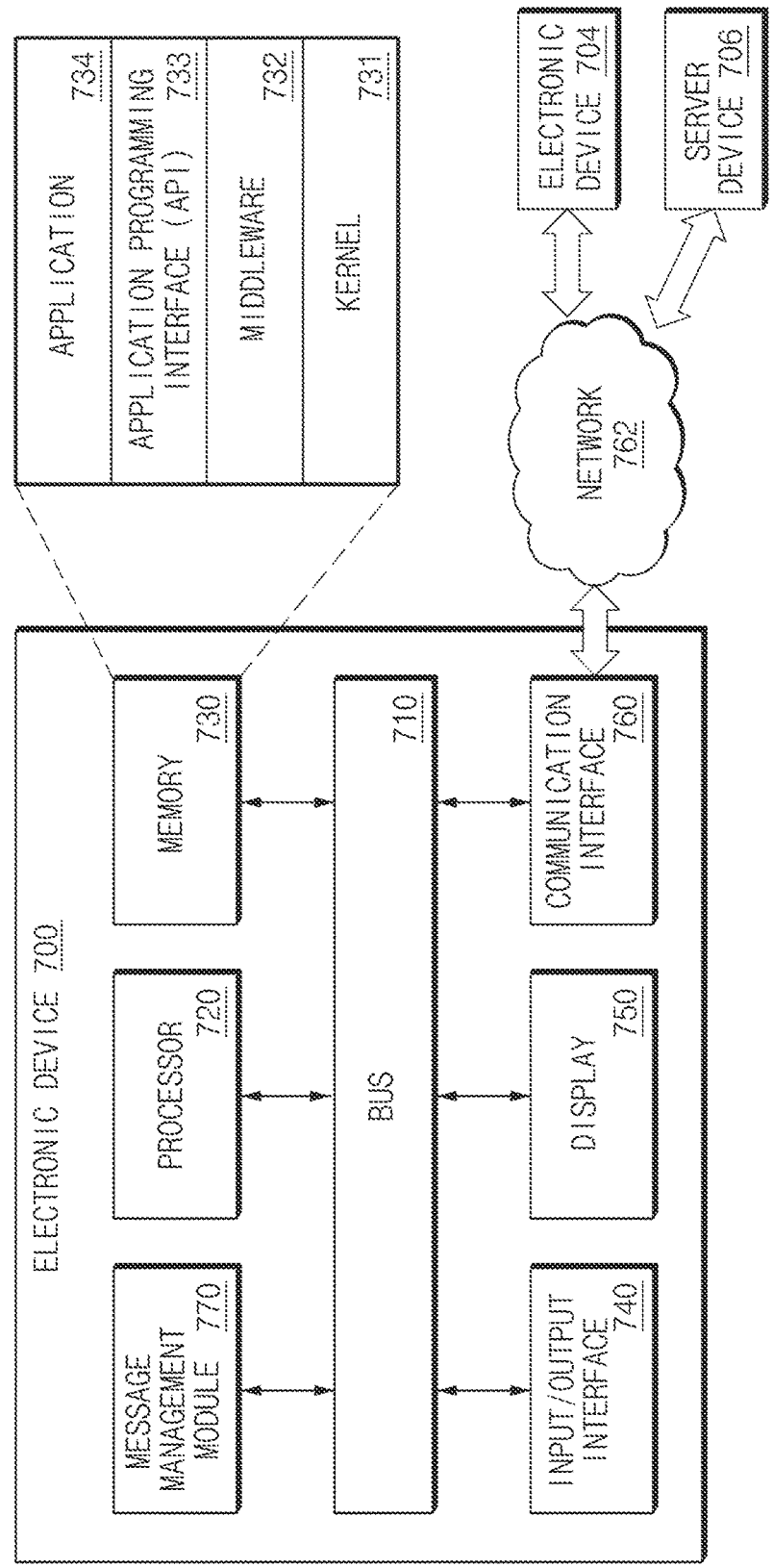
FIG. 7 is a diagram illustrating a network environment including an electronic device according to various embodiments of the present disclosure.

FIG. 7 is a diagram illustrating a network environment including an electronic device according to various embodiments of the present disclosure.

Referring to FIG. 7, an electronic device 700 may include a bus 710, a processor 720, a memory 730, an input/output (I/O) interface 740, a display 750, a communication interface 760, and a message management module 770. The message management module 770 may be understood as the above-described message management unit 120 or the above-described message format management unit 121. In FIG. 7, the processor 720 and the message management module 770 may be illustrated as being separate modules. However, the scope and spirit of the present disclosure may not be limited thereto. For example, the message management module 770 may be integrated in the processor 720.

The bus 710 may interconnect the above-described components and may be a circuit for conveying communications (e.g., a control message) among the above-described components.

The processor 720 may receive, for example, instructions from the above-described other components (e.g., the memory 730, the I/O interface 740, the display 750, the communication interface 760, the message management module 770, and the like) through the bus 710, may decode the received instructions, and may perform data processing or operations according to the decoded instructions.

The memory 730 may store instructions or data received from the processor 720 or other components (e.g., the I/O interface 740, the display 750, the communication interface 760, the message management module 770, and the like) or generated by the processor 720 or the other components. The memory 730 may include, for example, programming modules such as a kernel 731, a middleware 732, an application programming interface (API) 733, an application 734, and the like. Each of the above-described programming modules may be implemented in the form of software, firmware, hardware, or a combination of at least two thereof.

The kernel 731 may control or manage system resources (e.g., the bus 710, the processor 720, the memory 730, and the like) that are used to execute operations or functions of remaining other programming modules, for example, the middleware 732, the API 733, or the application 734. Furthermore, the kernel 731 may provide an interface that allows the middleware 732, the API 733, or the application 734 to access discrete components of the electronic device 700 so as to control or manage the middleware 732, the API 733, or the application 734.

The middleware 732 may perform a mediation role such that the API 733 or the application 734 communicates with the kernel 731 to exchange data. Furthermore, with regard to task requests received from the application 734, for example, the middle ware 732 may perform a control (e.g., scheduling or load balancing) on a task request using a method of assigning the priority, which makes it possible to use a system resource (e.g., the bus 710, the processor 720, the memory 730, or the like) of the electronic device 700, to the at least one application 734.

The API 733 may be an interface through which the application 734 controls a function provided by the kernel 731 or the middleware 732, and may include, for example, at least one interface or function (e.g., an instruction) for a file control, a window control, image processing, a character control, or the like.

According to various embodiments of the present disclosure, the application 734 may include an SMS/multimedia messaging service (MMS) application, an e-mail application, a calendar application, an alarm application, a health care application (e.g., an application for measuring an exercise amount, a blood sugar or the like), an environment information application (e.g., an application for providing air pressure, humidity, temperature information and the like) or the like. Additionally or generally, the application 734 may be an application associated with information exchange between the electronic device 700 and an external electronic device (e.g., an electronic device 704). The application associated with information exchange may include, for example, a notification relay application for transmitting specific information to an external electronic device or a device management application for managing an external electronic device.

For example, the notification relay application may include a function for providing an external electronic device (e.g., the electronic device 704) with notification information generated from another application (e.g., a message application, an e-mail application, a health care application, an environment information application and the like) of the electronic device 700. Additionally or generally, the notification relay application, for example, may receive notification information from an external electronic device (e.g., the electronic device 704) and may provide the notification information to a user. The device management application may manage (e.g., install, delete, or update), for example, a function (e.g., turn on/turn off of an external electronic device itself (or a portion of a constituent part) or control of brightness (or resolution) of a screen) of at least a portion of the external electronic device (e.g., the electronic device 704) communicating with the electronic device 700, an application operating on the external electronic device, or a service (e.g., a communication (or telephone) service or a message service) provided by the external electronic device.

According to various embodiments of the present disclosure, the application 734 may include an application that is designated according to an attribute (e.g., the kind of electronic device) of the external electronic device (e.g., the electronic device 704). For example, in the case where the external electronic device is an MP3 player, the application 734 may include an application associated with music reproduction. Similarly, in the case that the external electronic device is a mobile medical device, the application 734 may include an application associated with a health care. According to an embodiment of the present disclosure, the application 734 may include at least one of an application designated to the electronic device 700 or an application received from the external electronic device (e.g., the electronic device 704).

The I/O interface 740 may transmit an instruction or data, input from a user through an I/O device (e.g., a sensor, a keyboard, or a touch screen), to the processor 720, the memory 730, the communication interface 760, or the message management unit 770, for example, through the bus 710. For example, the I/O interface 740 may provide the processor 720 with user's touch data input through a touch screen. Furthermore, the I/O interface 740 may output an instruction or data, received from the processor 720, the memory 730, the communication interface 760, or the message management unit 770 through the bus 710, through the I/O device (e.g., a speaker or a display). For example, the I/O interface 740 may output voice data processed through the processor 720 to the user through a speaker.

The display 750 may display a variety of information (e.g., multimedia data, text data, and the like) for the user.

The communication interface 760 may establish communication between the electronic device 700 and an external electronic device (e.g., the electronic device 704 or a server 706). For example, the communication interface 760 may be connected to a network 762 through wireless communication or wired communication to communicate with the external electronic device. The wireless communication may include at least one of, for example, Wi-Fi, BT, near field communication (NFC), global positioning system (GPS), or cellular communication (e.g., 3G, LTE, LTE-advanced (LTE-A), CDMA, wideband CDMA (WCDMA), UMTS, wireless broadband (WiBro), GSM, or the like). Furthermore, the communication interface 760 may initiate, end, interrupt or change connection between the electronic device 700 and the external electronic device 704 or the server 706 (or a base station) through a CS network or a PS network. Furthermore, the communication interface 760 may be simultaneously attached to the CS network and the PS network or may be selectively connected thereto (e.g., a CSFB network). Furthermore, the communication interface 760 may support an IMS through the PS network such as LTE.

According to an embodiment of the present disclosure, the network 762 may be a telecommunications network. The telecommunications network may include at least one of a computer network, an internet, an internet of things, or a telephone network.

According to an embodiment of the present disclosure, a protocol (e.g., a transport layer protocol, a data link layer protocol, or a physical layer protocol) for communication between the electronic device 700 and an external device may be supported by at least one of the kernel 731, the middleware 732, the API 733, the application 734, or the communication interface 760.

The message management module 770 may process at least a portion of information obtained from other components (e.g., the processor 720, the memory 730, the I/O interface 740, the communication interface 760, and the like) and may provide the processed result to a user in various methods. For example, the message management module 770 may determine a message to be transmitted and received using NAS information and the like obtained from an RIL (e.g., RIL 130) or the communication interface 760 (e.g., a modem 140) and may perform an operation for compatibility between different specifications.

Figure 8:
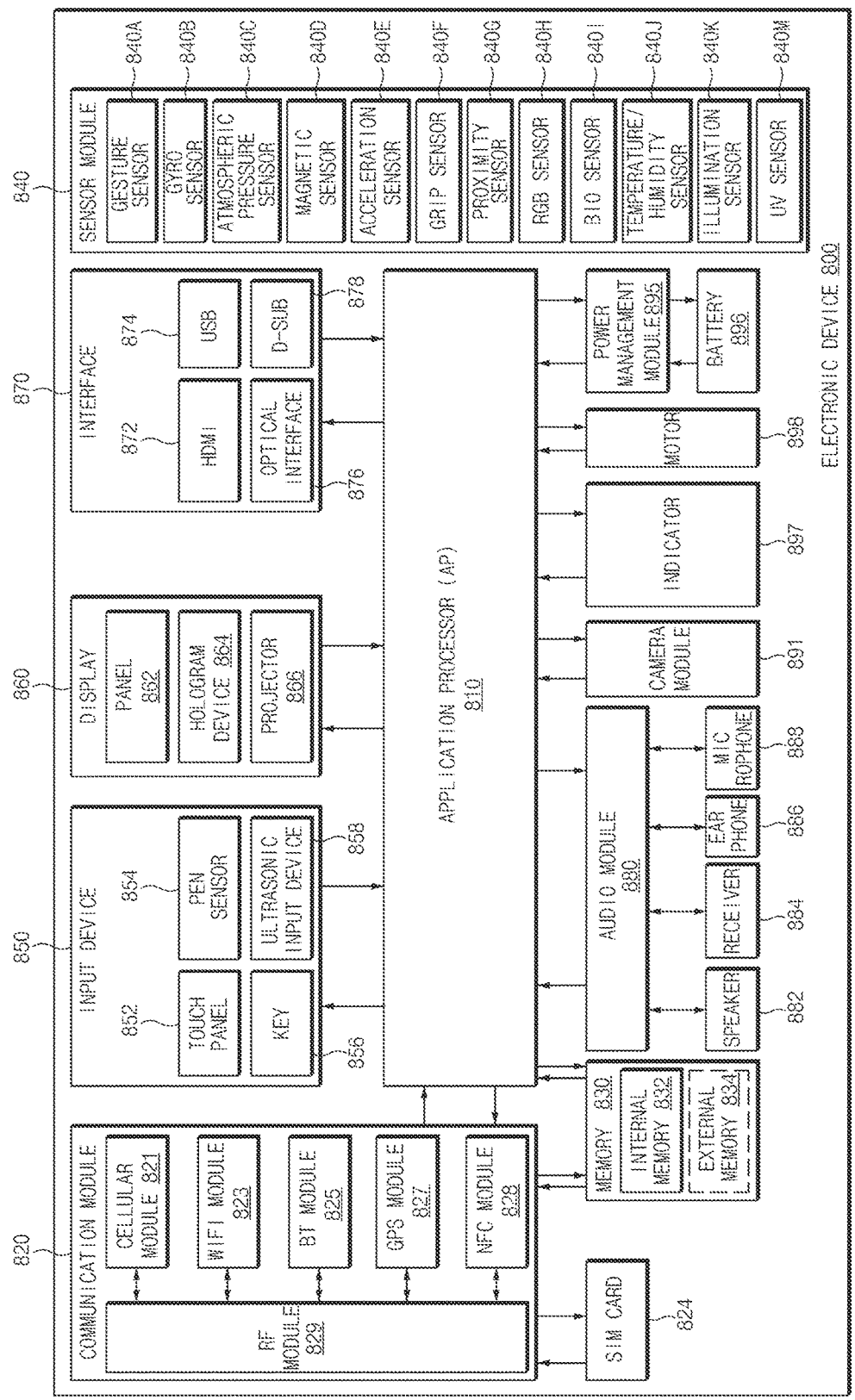
FIG. 8 is a block diagram illustrating an electronic device according to various embodiments of the present disclosure.

FIG. 8 is a block diagram illustrating an electronic device according to various embodiments of the present disclosure.

Referring to FIG. 8, an electronic device 800 may form the whole or a portion of an electronic device 700 illustrated in FIG. 7. The electronic device 800 may include one or more application processors (APs) 810, a communication module 820, a SIM card 824, a memory 830, a sensor module 840, an input device 850, a display 860, an interface 870, an audio module 880, a camera module 891, a power management module 895, a battery 896, an indicator 897, and a motor 898.

The AP 810 may drive an operating system (OS) or an application to control a plurality of hardware or software components connected to the AP 810 and may process and compute a variety of data including multimedia data. The AP 810 may be implemented with a system on chip (SoC), for example.

According to an embodiment of the present disclosure, the AP 810 may further include a graphic processing unit (GPU) (not illustrated).

The communication module 820 (e.g., the communication interface 760) may transmit and receive data when there are conveyed communications between other electronic devices (e.g., the electronic device 704 or a server 706) connected with the electronic device 800 (e.g., the electronic device 700) through a network.

According to an embodiment of the present disclosure, the communication module 820 may include a cellular module 821, a Wi-Fi module 823, a BT module 825, a GPS module 827, an NFC module 828, and a radio frequency (RF) module 829.

The cellular module 821 may provide voice communication, video communication, a character service, an Internet service or the like through a communication network (e.g., an LTE, an LTE-A, a CDMA, a WCDMA, a UMTS, a WiBro, a GSM, and the like). Also, the cellular module 821 may perform discrimination and authentication of an electronic device within a communication network using a SIM (e.g., a SIM card 824), for example. According to an embodiment of the present disclosure, the cellular module 821 may perform at least a portion of functions that the AP 810 provides. For example, the cellular module 821 may perform at least a portion of a multimedia control function.

According to an embodiment of the present disclosure, the cellular module 821 may include a communication processor (CP). Also, the cellular module 821 may be implemented with, for example, an SoC. Although components such as the cellular module 821 (e.g., a communication processor), the memory 830, the power management module 895, and the like are illustrated as being components independent of the AP 810, the AP 810 may be implemented to include at least a portion (e.g., a cellular module 821) of the above components.

According to an embodiment of the present disclosure, the AP 810 or the cellular module 821 (e.g., a communication processor) may load and process an instruction or data received from nonvolatile memories respectively connected thereto or from at least one of other elements at the nonvolatile memory. Also, the AP 810 or the cellular module 821 may store data received from at least one of other elements or generated by at least one of other elements at a nonvolatile memory.

Each of the Wi-Fi module 823, the BT module 825, the GPS module 827, and the NFC module 828 may include a processor for processing data exchanged through a corresponding module, for example.

In FIG. 8, an embodiment of the present disclosure is exemplified as the cellular module 821, the Wi-Fi module 823, the BT module 825, the GPS module 827, and the NFC module 828 are separate blocks, respectively.

According to an embodiment of the present disclosure, at least a portion (e.g., two or more components) of the cellular module 821, the Wi-Fi module 823, the BT module 825, the GPS module 827, and the NFC module 828 may be included within one integrated circuit (IC) or an IC package. For example, at least a portion (e.g., a communication processor corresponding to the cellular module 821 and a Wi-Fi processor corresponding to the Wi-Fi module 823) of communication processors corresponding to the cellular module 821, the Wi-Fi module 823, the BT module 825, the GPS module 827, and the NFC module 828 may be implemented with one SoC.

The RF module 829 may transmit and receive data, for example, an RF signal. Although not illustrated, the RF module 829 may include a transceiver, a power amplifier module (PAM), a frequency filter, or low noise amplifier (LNA). Also, the RF module 829 may further include the following part for transmitting and receiving an electromagnetic wave in a space in wireless communication: a conductor or a conducting wire.

In FIG. 8, an embodiment of the present disclosure is exemplified as the cellular module 821, the Wi-Fi module 823, the BT module 825, the GPS module 827, and the NFC module 828 are implemented to share one RF module 829.

According to an embodiment of the present disclosure, at least one of the cellular module 821, the Wi-Fi module 823, the BT module 825, the GPS module 827, or the NFC module 828 may transmit and receive an RF signal through a separate RF module.

The SIM card 824 may be a card that includes a SIM and may be inserted to a slot formed at a specific position of the electronic device. The SIM card 824 may include unique identity information (e.g., IC card identifier (ICCID)) or subscriber information (e.g., integrated mobile subscriber identity (IMSI)).

The memory 830 (e.g., the memory 730) may include an embedded memory 832 or an external memory 834. For example, the embedded memory 832 may include at least one of a volatile memory (e.g., a dynamic random access memory (DRAM), a static RAM (SRAM), or a synchronous DRAM (SDRAM)) and a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present disclosure, the internal memory 832 may be a solid state drive (SSD). The external memory 834 may include a flash drive, for example, compact flash (CF), secure digital (SD), micro-SD, mini-SD, extreme digital (xD) or a memory stick. The external memory 834 may be functionally connected to the electronic device 800 through various interfaces.

According to an embodiment of the present disclosure, the electronic device 800 may further include a storage device (or a storage medium), such as a hard drive.

The sensor module 840 may measure a physical quantity or may detect an operation state of the electronic device 800. The sensor module 840 may convert the measured or detected information to an electric signal. The sensor module 840 may include at least one of a gesture sensor 840A, a gyro sensor 840B, a pressure sensor 840C, a magnetic sensor 840D, an acceleration sensor 840E, a grip sensor 840F, a proximity sensor 840G, a color sensor 840H (e.g., red, green, blue (RGB) sensor), a living body sensor 840I, a temperature/humidity sensor 840J, an illuminance sensor 840K, or an UV sensor 840M. Although not illustrated, additionally or generally, the sensor module 840 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 840 may further include a control circuit for controlling at least one or more sensors included therein.

The input device 850 may include a touch panel 852, a (digital) pen sensor 854, a key 856, or an ultrasonic input unit 858. The touch panel 852 may recognize a touch input using at least one of capacitive, resistive, infrared and ultrasonic detecting methods. Also, the touch panel 852 may further include a control circuit. In the case of using the capacitive detecting method, a physical contact recognition or proximity recognition may be allowed. The touch panel 852 may further include a tactile layer. In this case, the touch panel 852 may provide a tactile reaction to a user.

The (digital) pen sensor 854 may be implemented in a similar or same manner as the method of receiving a touch input of a user or may be implemented using an additional sheet for recognition. The key 856 may include, for example, a physical button, an optical key, a keypad, and the like. The ultrasonic input device 858, which is an input device for generating an ultrasonic signal, may enable the electronic device 800 to sense detect a sound wave through a microphone (e.g., a microphone 888) so as to identify data, wherein the ultrasonic input device 858 is capable of wireless recognition.

According to an embodiment the present disclosure, the electronic device 800 may use the communication module 820 so as to receive a user input from an external device (e.g., a computer or server) connected to the communication module 820.

The display 860 (e.g., a display 750) may include a panel 862, a hologram device 864, or a projector 866. The panel 862 may be, for example, a liquid crystal display (LCD), an active matrix organic light-emitting diode (AM-OLED), or the like. The panel 862 may be, for example, flexible, transparent or wearable. The panel 862 and the touch panel 852 may be integrated into a single module. The hologram device 864 may display a stereoscopic image in a space using a light interference phenomenon. The projector 866 may project light onto a screen so as to display an image. The screen may be arranged in the inside or the outside of the electronic device 800.

According to an embodiment of the present disclosure, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-subminiature (D-sub) 878. The interface 870 may be included, for example, in a communication interface 760 illustrated in FIG. 7. Additionally or generally, the interface 870 may include, for example, a mobile high definition link (MHL) interface, an SD card/multi-media card (MMC) interface, or an infrared data association (IrDA) standard interface.

The audio module 880 may convert a sound and an electric signal in dual directions. At least a portion of the audio module 880 may be included, for example, in an I/O interface 740 illustrated in FIG. 7. The audio module 880 may process, for example, sound information that is input or output through a speaker 882, a receiver 884, an earphone 886, or the microphone 888.

According to an embodiment of the present disclosure, the camera module 891 for shooting a still image or a video may include at least one image sensor (e.g., a front sensor or a rear sensor), a lens (not illustrated), an image signal processor (ISP, not illustrated), or a flash (e.g., an LED or a xenon lamp, not illustrated).

The power management module 895 may manage power of the electronic device 800. Although not illustrated, a power management IC (PMIC) a charger IC, or a battery or fuel gauge may be included in the power management module 895.

The PMIC may be mounted on an IC or an SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, or a rectifier, and the like.

The battery gauge may measure, for example, a remaining capacity of the battery 896 and a voltage, current or temperature thereof while the battery is charged. The battery 896 may store or generate electricity, and may supply power to the electronic device 800 using the stored or generated electricity. The battery 896 may include, for example, a rechargeable battery or a solar battery.

The indicator 897 may display a specific state of the electronic device 800 or a portion thereof (e.g., the AP 810), such as a booting state, a message state, a charging state, and the like. The motor 898 may convert an electrical signal into a mechanical vibration. Although not illustrated, a processing device (e.g., a GPU) for supporting a mobile TV may be included in the electronic device 800. The processing device for supporting a mobile TV may process media data according to the standards of digital media broadcasting (DMB), digital video broadcasting (DVB) or media flow.

Each of the above-mentioned elements of the electronic device according to various embodiments of the present disclosure may be configured with one or more components, and the names of the elements may be changed according to the type of the electronic device.

The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

According to various embodiments of the present disclosure, an electronic device supporting to transmit and receive a message of at least a first format may include a communication module configured to transmit and receive a message, and a message management module configured to determine a format of a message to be transmitted by the communication module. Here, the message management module may be configured to determine whether to transmit or receive a message of a second format different from the first format using at least one bearer type allowing the communication module to transmit or receive a message and to determine the message format based on the determination result. Furthermore, the above-described methods may be implemented through the electronic device. To this end, the electronic device may be variously changed or modified (e.g., adding components or omitting a portion of components).

Figure 9:
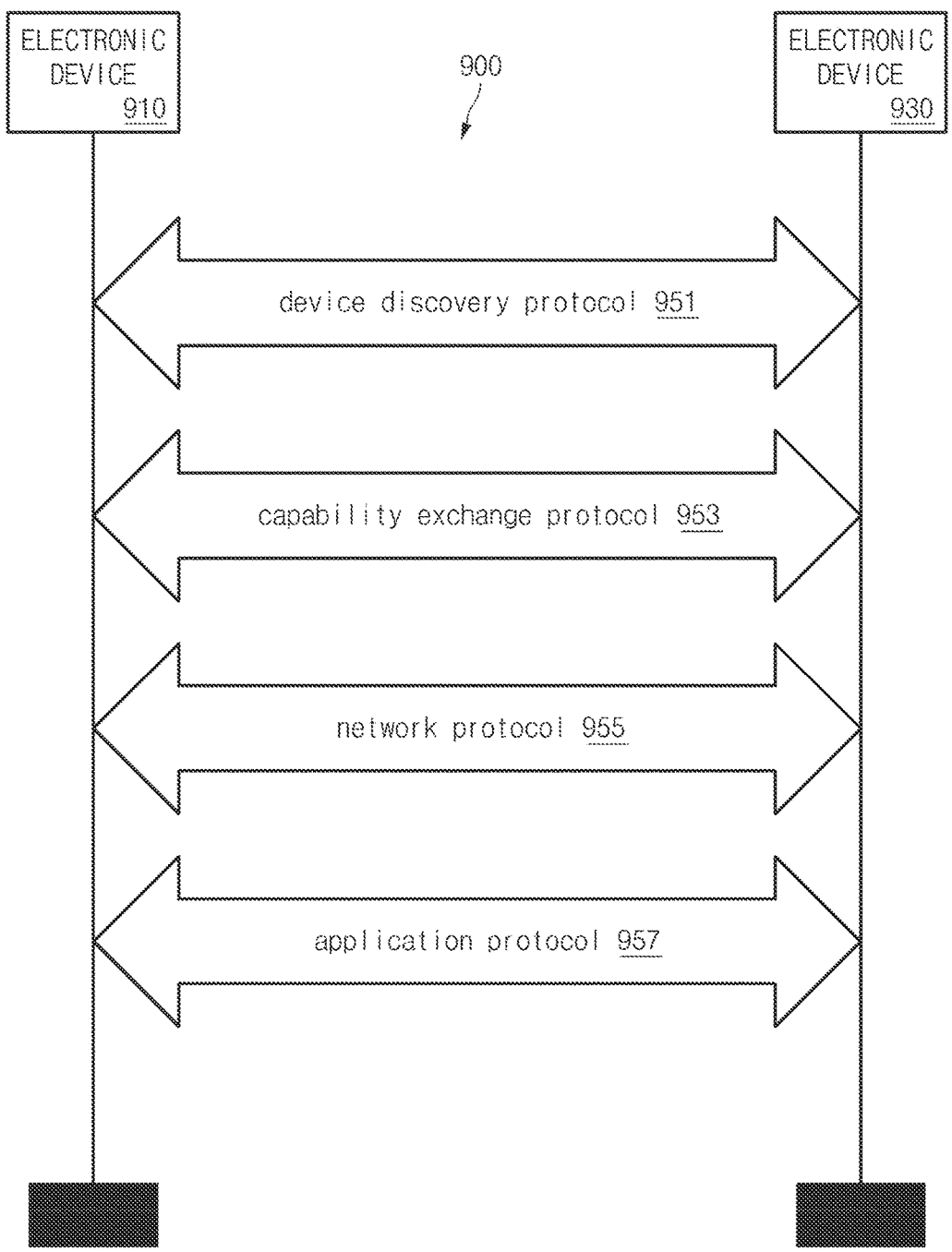
FIG. 9 is a view illustrating a communication protocol between electronic devices according to various embodiments of the present disclosure.

FIG. 9 is a view illustrating a communication protocol between a plurality of electronic devices according to various embodiments of the present disclosure.

Referring to FIG. 9, a communication protocol 900 may include, for example, a device discovery protocol 951, a capability exchange protocol 953, a network protocol 955, an application protocol 957, and the like.

According to an embodiment of the present disclosure, the device discovery protocol 951 may include a protocol for allowing electronic devices (e.g., an electronic device 910 or an electronic device 930) to detect an external electronic device that may communicate with them, or for connecting with the detected external electronic device. For example, the electronic device 910 (e.g., an electronic device 700) may detect the electronic device 930 (e.g., the electronic device 704) as a device that communicates with the electronic device 910 via a communication method (e.g., Wi-Fi, BT, USB, or the like) available at the electronic device 910. For communication connection with the electronic device 930, the electronic device 910 may obtain and store identification information on the detected electronic device 930 using the device discovery protocol 951. The electronic device 910 may establish communication connection with the electronic device 930, for example, based on at least the identification information.

According to an embodiment of the present disclosure, the device discovery protocol 951 may be a protocol for mutual authentication between a plurality of electronic devices. For example, the electronic device 910 may perform authentication between the electronic device 910 and the electronic device 930 based on communication information (e.g., a media access control (MAC) address, a universally unique ID (UUID), a subsystem identification (SSID), an information provider (IP) address) for connection with at least the electronic device 930.

According to an embodiment of the present disclosure, a function exchange protocol 953 may be a protocol for exchanging information related to a function of a service supportable by at least one of the electronic device 910 and the electronic device 930. For example, the electronic device 910 and the electronic device 930 may exchange information related to a function of a service currently provided by the respective devices with each other via the capability exchange protocol 953. Exchangeable information may include identification information indicating a specific service among a plurality of services supportable by the electronic device 910 and the electronic device 930. For example, the electronic device 910 may receive identification information of a specific service provided by the electronic device 930 from the electronic device 930 via the capability exchange protocol 953. In this case, the first electronic device 910 may determine whether the electronic device 910 supports a specific service, based on the received identification information.

According to an embodiment of the present disclosure, the network protocol 955 may be a protocol for controlling a data flow between the electronic devices (e.g., the electronic device 910 and the electronic device 930) connected for enabling communication, for example, transmitted/received for providing a service in cooperation with electronic devices. For example, at least one of the electronic device 910 and the electronic device 930 may perform an error control, a data quality control, or the like using the network protocol 955. Additionally or generally, the network protocol 955 may determine a transmission format of data transmitted/received between the electronic device 910 and the electronic device 930. Furthermore, the electronic device 910 or the electronic device 930 may manage (e.g., session connection or session termination) at least a session for data exchange using the network protocol 955.

According to an embodiment of the present disclosure, the application protocol 957 may be a protocol for providing a procedure or information for exchanging data related to a service provided to an external electronic device. For example, the electronic device 910 (e.g., the electronic device 700) may provide a service to the electronic device 930 (e.g., the electronic device 704 or the server 706) via the application protocol 957.

According to an embodiment of the present disclosure, the communication protocol 900 may include a standard communication protocol, a communication protocol (e.g., a communication protocol designated by a communication device manufacturer or a network supplier itself) designated by an individual or an organization, or a combination thereof.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure may be, for example, implemented by instructions stored in a computer-readable storage media in the form of a programmable module. The instruction, when executed by one or more processors (e.g., the processor 720), may cause the one or more processors to perform a function corresponding to the instruction. The computer-readable storage media, for example, may be the memory 730. At least a portion of the programming module may be implemented (e.g., executed), for example, by the processor 720. At least a portion of the programming module may include, for example, modules, programs, routines, sets of instructions, or processes, or the like for performing one or more functions.

A computer-readable recording medium may include hardware, which is configured to store and execute a program instruction (e.g., a programming module), such as a hard disk, a magnetic media such as a floppy disk and a magnetic tape, an optical media such as compact disc ROM (CD-ROM) and a DVD, a magneto-optical media such as a floptical disk, and hardware devices such as ROM, RAM, and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a program module, or other elements according to an embodiment of the present disclosure may be executed sequentially, in parallel, repeatedly, or in a heuristic method. Also, a portion of operations may be executed in different sequences, omitted, or other operations may be added.

According to various embodiments of the present disclosure, a storage medium storing instructions, the instructions, when executed by at least one processor, causing the at least one process to perform at least one of obtaining information on at least one bearer type allowing the electronic device, which supports to transmit and receive a message of at least a first format, to transmit or receive a message, determining whether the electronic device transmits or receives a message of a second format different from the first format based on at least one of the bearer types, and transmitting the message using the second format or the first format, in which a specific value is set to be compatible with the second format, based on the determination result.

According to various embodiments of the present disclosure, it may be possible to solve a compatibility problem or an error caused when transmitting/receiving a message using different network environments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A message transmitting method of an electronic device supporting to transmit and receive a message of a first format, the message transmitting method comprising:
    obtaining information on at least one bearer type allowing the electronic device to transmit or receive a message;
    determining whether the electronic device transmits or receives a message of a second format different from the first format based on at least one of the at least one bearer type; and
    transmitting the message using the second format, or transmitting the message using the first format in which a specific value is set to be compatible with the second format, based on the determination result.

2. The message transmitting method of claim 1,
    wherein the first format and the second format are message formats respectively defined by 3rd generation partnership project 2 (3GPP2) and 3GPP, and
    wherein the determining of whether the electronic device transmits or receives the message of a second format different from the first format comprises:
        determining whether the electronic device supports an internet protocol (IP) multimedia subsystem (IMS); and
        determining whether the electronic device receives the message of the second format when the electronic device is in a state that the electronic device is registered the IMS.

3. The message transmitting method of claim 2, wherein the transmitting of the message comprises:
    setting a value of a message identifier (ID) of the first format to a value compatible with the second format.

4. The message transmitting method of claim 3, wherein the message ID is set to have a value of one byte.

5. The message transmitting method of claim 3, wherein a value of the message ID is set to be used for a delivery report message received from a server.

6. The message transmitting method of claim 1, wherein the obtaining comprises:
    obtaining information on a network to which the electronic device is connected; and
    obtaining information on a bearer type associated with a circuit switching (CS) network using additional information if the information on the network does not include information on a CS network type.

7. The message transmitting method of claim 6,
    wherein the additional information comprises whether the electronic device remains at a roaming state, and
    wherein the obtaining of information on the bearer type associated with a CS network comprises obtaining information on the at least one bearer type based on a roaming region, if the electronic device remains at the roaming state.

8. The message transmitting method of claim 6,
    wherein the additional information comprises information on a provider associated with a subscriber identification module (SIM) mounted on the electronic device, and
    wherein the obtaining of information on a bearer type associated with a CS network comprises obtaining information on the at least one bearer type based on CS network type information set such that the provider associated with the SIM uses.

9. The message transmitting method of claim 6,
    wherein the additional information comprises mobile country code (MCC) or mobile network code (MNC) information, and
    wherein the obtaining of information on the bearer type associated with a CS network comprises:
        obtaining information on the at least one bearer type using the MCC or MNC information.

10. The message transmitting method of claim 6,
    wherein the additional information comprises long term evolution (LTE) short message service (SMS) status information, and
    wherein the obtaining of information on a bearer type associated with a CS network comprises:
        obtaining information on the at least one bearer type based on a CS network type specified in the LTE SMS status information.

11. The message transmitting method of claim 6, wherein the determining comprises:
    determining whether the first format and the second format correspond to each other.

12. The message transmitting method of claim 11, wherein a message is transmitted using the second format if the determination result indicates that the first format and the second format do not correspond to each other.

13. The message transmitting method of claim 6,
    wherein the obtaining of information on a bearer type associated with a CS network is performed if information on the at least one bearer type does not include internet protocol (IP) multimedia subsystem (IMS) information, and
    wherein the method further comprises transmitting the message through an IMS if information on the at least one bearer type includes the IMS information.

14. An electronic device supporting to transmit and receive a message of at least a first format, the electronic device comprising:
    a communication module configured to transmit and receive a message; and
    a message management module configured to determine a format of a message to be transmitted by the communication module,
    wherein the message management module is further configured to:
        determine whether to transmit or receive a message of a second format different from the first format using at least one bearer type allowing the communication module to transmit or receive a message, and
        determine the message format based on the determination result.

15. The electronic device of claim 14, wherein the message management module is further configured to alter a message format of the message to conform to a format of a message of the at least one bearer type.

16. A non-transitory computer-readable storage medium storing instructions, the instructions executed by at least one processor, causing the at least one process to perform a method of:
    obtaining information on at least one bearer type allowing the electronic device, which supports to transmit and receive a message of at least a first format, to transmit or receive a message;
    determining whether the electronic device transmits or receives a message of a second format different from the first format based on at least one of the bearer types; and
    transmitting the message using the second format or the first format, in which a specific value is set to be compatible with the second format, based on the determination result.

* * * * *